United States Patent
Savarimuthu et al.

(10) Patent No.: US 9,962,835 B2
(45) Date of Patent: May 8, 2018

(54) DEVICE FOR DYNAMIC SWITCHING OF ROBOT CONTROL POINTS

(71) Applicant: Syddansk Universitet, Odense M (DK)

(72) Inventors: Thiusius Rajeeth Savarimuthu, Odense (DK); Dorthe Soelvason, Odense (DK); Kamil Kuklinski, Augustow (PL); Norbert Krüger, Odense (DK); Kerstin Fischer, Hamburg (DE); Maria Vanessa Aus Der Wieschen, Kolding (DK); Franziska Kirstein, Voehl-Herzhausen (DE); Ilka Marhenke, Berlin (DE)

(73) Assignee: Syddansk Universitet, Odense M (DK)

( * ) Notice: Subject to any disclaimer, the term of this patent is extended or adjusted under 35 U.S.C. 154(b) by 0 days. days.

(21) Appl. No.: 15/105,650

(22) PCT Filed: Dec. 3, 2014

(86) PCT No.: PCT/DK2014/050412
§ 371 (c)(1),
(2) Date: Jun. 17, 2016

(87) PCT Pub. No.: WO2015/090324
PCT Pub. Date: Jun. 25, 2015

(65) Prior Publication Data
US 2016/0318185 A1 Nov. 3, 2016

(30) Foreign Application Priority Data
Dec. 17, 2013 (DK) .................. 2013 70783

(51) Int. Cl.
*G05B 19/04* (2006.01)
*B25J 9/16* (2006.01)
(Continued)

(52) U.S. Cl.
CPC .......... *B25J 9/1689* (2013.01); *B25J 13/084* (2013.01); *B25J 13/085* (2013.01); *B25J 19/023* (2013.01); *G05B 2219/40193* (2013.01)

(58) Field of Classification Search
CPC ...... B25J 9/1689; B25J 13/084; B25J 13/085; B25J 19/023
See application file for complete search history.

(56) References Cited

U.S. PATENT DOCUMENTS

| 4,589,810 A | 5/1986 | Heindl et al. |
| 7,298,385 B2 | 11/2007 | Kazi et al. |

(Continued)

FOREIGN PATENT DOCUMENTS

| EP | 0 333 874 A1 | 9/1989 |
| EP | 0 188 623 B1 | 12/1991 |

(Continued)

OTHER PUBLICATIONS

Bergstrom, Method for claibration of off-line generated robot program; Master of Science Thesis, Department of Automatic Control, Division of Automation and Mechanics, Chalmbers University of Technology, Goteborg, Sweden, Report No. EX099/2011, pp. 1-112, 2011.

(Continued)

*Primary Examiner* — Ian Jen
(74) *Attorney, Agent, or Firm* — Woodard, Emhardt, Moriarty, McNett & Henry LLP

(57) ABSTRACT

The invention comprises a system for switching between control points of a robotic system involving an industrial robot including a robot arm with a number of joints and provided with a tool interest point movable in a plurality of degrees of freedom.

9 Claims, 4 Drawing Sheets

(51) Int. Cl.
B25J 13/08 (2006.01)
B25J 19/02 (2006.01)

(56) References Cited

U.S. PATENT DOCUMENTS

| | | | |
|---|---|---|---|
| 9,335,752 B2* | 5/2016 | Fudaba | B25J 3/04 |
| 2004/0189631 A1 | 9/2004 | Kazi et al. | |
| 2008/0085048 A1 | 4/2008 | Venetsky et al. | |
| 2009/0265036 A1 | 10/2009 | Jamieson et al. | |
| 2010/0286826 A1* | 11/2010 | Tsusaka | B25J 9/1633 |
| | | | 700/254 |
| 2011/0288964 A1* | 11/2011 | Linder | B25J 9/1689 |
| | | | 705/27.1 |
| 2013/0041508 A1 | 2/2013 | Hu et al. | |
| 2013/0053866 A1 | 2/2013 | Leung | |
| 2013/0151007 A1* | 6/2013 | Valpola | B25J 9/1694 |
| | | | 700/245 |
| 2013/0245824 A1 | 9/2013 | Barajas et al. | |
| 2014/0135792 A1* | 5/2014 | Larkin | B25J 9/1671 |
| | | | 606/130 |
| 2015/0073596 A1* | 3/2015 | Fudaba | B25J 3/04 |
| | | | 700/259 |
| 2015/0352716 A1* | 12/2015 | Sonehara | B25J 9/1633 |
| | | | 700/261 |
| 2016/0082598 A1* | 3/2016 | Anducas Aregall | B25J 19/022 |
| | | | 382/153 |

FOREIGN PATENT DOCUMENTS

| | | |
|---|---|---|
| EP | 0 216 930 B1 | 8/1992 |
| EP | 0 780 197 A1 | 6/1997 |
| WO | WO 00/60427 | 10/2000 |
| WO | WO 2004/071717 A1 | 8/2004 |
| WO | WO 2005/060338 A2 | 7/2005 |
| WO | WO 2006/055770 A2 | 5/2006 |
| WO | WO 2006/117022 A1 | 11/2006 |
| WO | WO 2012/143044 A1 | 10/2012 |

OTHER PUBLICATIONS

Pilarski, et al., Adaptive Artificial Limbs A Real-Time Approach to Prediction and Anticipation; IEEE Robotics & Automation Magazine, pp. 53-64, Mar. 2013.
Pilarski, et al., Dynamic Switching and Real-Time Machine Learning for Improved Human Control of Assistive Biomedical Robots; IEEE RAS/EMBS International Conference on Biomedical Robotics and Biomechatronics, Roma, Italy, pp. 1-112, Jun. 2012.
Written Opinion and Search Report from related PCT/DK2014/050412 dated Apr. 15, 2015.
Fuentes, et al, The Virtual Tool Approach to Dextrous Telemanipulation, Proceedings of the 1996 IEEE International Conference on Robotics and Automation, New York, NY, USA, IEES, US, vol. 2, Apr. 22, 1996, pp. 1700-1705.
Michelman, et al, Shared autonomy in a robot hand teleoperation system, Proceedings of the International Conference of Intelligent Robots and Systems (IROS), vol. 1, Sep. 12, 1994, pp. 253-259.

* cited by examiner

DEVICE FOR DYNAMIC SWITCHING OF ROBOT CONTROL POINTS

FIELD OF THE INVENTION

The present invention is a device for switching between control points of a robotic system in a teleoperative control mode.

BACKGROUND OF THE INVENTION

There is a growing interest in applying robots in production for small or medium size production lines, where the production process needs to be adapted or modified more often. In these production cases it can be difficult to justify implementation of a robotic system due to system programming costs. One of the reasons for high cost is that the robot programming needs to be performed by a skilled technician.

Recently, robot manufactures have introduced new and improved interfaces for programming robots. Such interfaces are, for instance, kinesthetic guidance or the use of a teaching pendant to control individual joints.

Often when programming a robot by using one of the above mentioned interfaces, the robot operator manually moves the robot to a plurality of points along the path in order to teach the robot the desired robot path. This process is time consuming and tedious.

For most industrial robots there is no unique path in joint space for moving the tool centre point along a given path in the Cartesian space. In general, there are infinitely many joint space paths that achieve the desired tool centre point path. Since inverse kinematics of industrial robots are undetermined, the problem is often cast as an optimization problem. Here, the tool centre point path should be followed while at the same time a goal function is maximized. The goal function can range between staying away from joint limits to avoiding singularities or physically obstacles.

To overcome these issues, recent developments in technology have enabled the possibility to implement realtime and fast teleoperation of an industrial robot. During teleoperation the user of the robotic system manipulates the teleoperation device and hereby manipulates the robotic system.

The advantages of using teleoperation compared to the control modes mentioned above are that the Cartesian space control of the robot becomes more intuitive to teach for the user.

However, a major problem with existing robots is that the robot control point depends on whether the arm is moved by itself, with a small object or with a long object. For instance, the operator cannot easily teach the robot arm to move an object held by the robot arm entirely based on movements relative to the tool center point. In case of a long object held at one end by the robot arm and intended to be moved precisely with the other end (e.g. the other end of the object has some means that should be connected precisely to something), it is extremely difficult for the operator to teach the robot arm to move the other end precisely. Furthermore, learning how to manipulate long objects from the movements controlled at the center point is next to impossible.

One of the limitations of the current teleoperation systems is therefore that they rely on controlling a single point of interest during teaching mode. For advanced industrial assembly tasks it is important to be able to switch between different control points.

The present invention facilitates the switching between robot control points and thus reduces the time needed for teaching the robot a robot path and provides more accurate training data for learning by demonstration.

SUMMARY OF THE INVENTION

The objective of the present invention is to improve learning by demonstration and control of an industrial robot comprising a robotic arm in a teleoperative control mode, which alleviates the above mentioned problems. The objective is achieved by the present invention by allowing the user to dynamically switch between controlling the position and orientation of the tool central point (TCP) of the robot to controlling one or more interest points of the object.

According to the respective embodiment of the invention, the control unit is adapted to dynamically switch between TCP and object interest point (OIP) in the teach mode. It makes use of the intuitive knowledge of the user, which is completely effortless and comes at no extra cost.

The present invention therefore provides a novel system for switching between control points of a robotic system involving an industrial robot including a robot arm with a number of joints, such as 1, 2, 3, 4, 5, 6, 7, or 8 joints, and provided with a tool interest point movable in a plurality of degrees of freedom. The system operates with a tool centre point (TCP) and object interest point (OIP) at a predefined position in or on the object. The system can switch in the teachmode from the an operation defined in relation to the tool interest point to operation defined in relation to the object interest point (OIP), with a control device for manually controlling the movements of the object during a teach mode.

Specifically, the present invention provides a robotic system comprising:
  a robot arm with a number of joints and provided with a tool interface movable in a plurality of degrees of freedom, and a tool centre point (TCP) in space, said tool interface being able to hold an object;
  a detection unit that detects the position and orientation of the object in space, said detection unit being programmable to detect a specific point in or on the object, said point being defined as an object interest point (OIP);
  a user operated control device that can dynamically switch between TCP and OIP based teach modes, said control device adapted to let a user instruct movements of the robot arm thereby manually controlling the movement of the object relative to the TCP and/or OIPs;
wherein the switching from the TCP to OIP based teach mode results in the operator being able to control the robot movements relative to the OIP.

A robotic system as used in the context of the present invention may be both physical and virtual.

Preferably, the detection unit uses a set of cameras to detect the position and orientation of the object.

In a preferred embodiment of the present invention a feedback mode is adopted for informing the user of the forces or torque experienced by the object, such as when the object hits an obstacle. This feedback mode is based on tactile, visual, or temperature sensing by the user. For example, the feedback may be based on vibration of the control device.

The robot control program is determined during the teach mode, and this program is later executed during run-time mode. Hence, the robot is fully predictable at runtime, while being easy to work with during teaching.

DETAILED DESCRIPTION OF THE INVENTION

The present invention provides an intuitive and easy way to switch between control points of a robotic system. The user of the system can dynamically switch from controlling any point of the robot or the object attached to the robot. By tracking the movement of the user and transferring these movements to the robot, the system gives the user an improved and intuitive way of controlling the robot. During a robot manipulation task there will be a need to control different points of the system. Typically these points are the robot TCP and later some points on the object being manipulated. The need to switch control points appears when the robotic system grasps or manipulates an object. The device gives the user the ability to switch between these control points dynamically, allowing not only for more accurate robot control, but also serves to inform the robot on the reference point for learning from demonstration.

Involved in one embodiment of the present invention is the so-called trakSTAR system, which is an electromagnetic tracking system. It has three components: a transmitter, four sensors and an electronics unit that calculates the pose of each sensor relative to the transmitter.

In normal operation of the robot, the control works by requesting a target base-to-end transformation or target joint configuration. For the teleoperation system, a servo command on the robot controller was utilized. A unique feature of this service is that there is no task queue, meaning that once a new base-to-end transformation is requested, the robot changes direction towards the new target configuration immediately. This behaviour is optimal for the teleoperating system. When solving the inverse kinematics, a limitation has been applied to the distance from the current solution to any new solution to prevent that the robot suddenly chooses, for instance, an elbow-down solution if the current configuration is elbow-up.

Scaling can be used to slow down or speed up translation and/or rotation to a suitable level. This parameter could be used in combination with acceleration to fine-tune the teleoperating system. For the invention, scaling has been excluded such that any movement with the operator's hand is duplicated in the robot. The operator can control the centre of the tool and to some extent ignore the kinematics of the robot and expect it to follow the movements of the hand. The latter solution has been chosen for two reasons: (1) smaller and more precise variations of the tool's pose are possible when the tool is controlled directly, and (2) allow for more intuitive handling by laypersons. The actual sensor is implanted into the handheld device. An image from the teleoperation setup is shown in FIG. 1.

Figure 1:
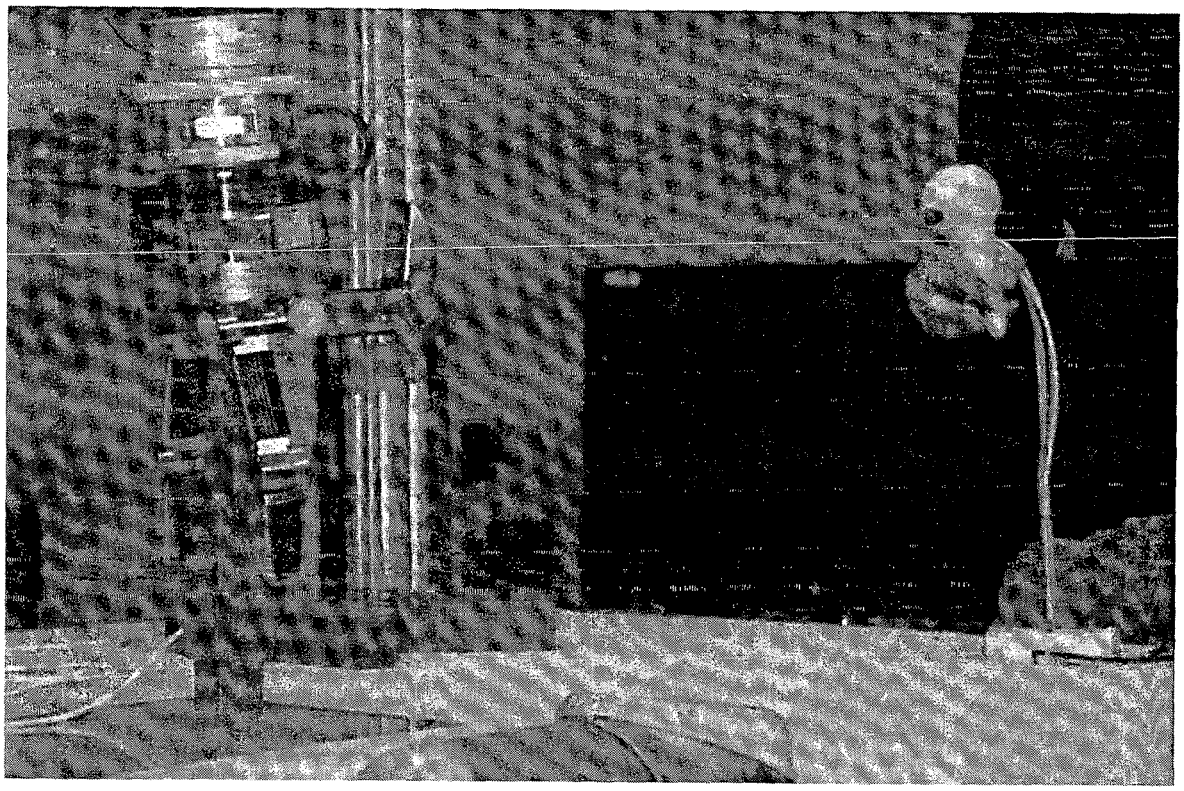
FIG. 1 shows the teleoperating setup with the hand-mounted sensor and the robot's arm.

The system shown in FIG. 1 is a DC electromagnetic system, capable of outputting a full 6D pose (position and orientation) for four sensors at up to 240 Hz. Furthermore, up to four electronics units can be connected giving the system 16 possible sensors, connected to a computer via one USB cable per electronics unit to uphold the bandwidth. Being a DC system, the electromagnetic field is steady while the measurements are made, thus allowing eddy currents to die out beforehand. Eddy currents cause problems for AC electromagnetic systems in all ferromagnetic materials but also in stainless steel and aluminium because the electromagnetic field is constantly changing.

Due to the physics of electromagnetic dipoles, the field strength drops with the distance to the power of 3. It is important that the precision is high near the operator in order to have a jitter-free teleoperating setup. The operator must be able to trust that the robot follows every moment—and likewise is steady when the sensor is not moved. Originally, three different placements for the position were considered. To minimize distortion and noise near the operator, however, the transmitter was installed in one end of the platform table. This way, both the operator's hand and the objects on the table can be tracked simultaneously and with optimal signal to noise ratio for the sensor controlling the robot. There are two types of errors to consider when working with magnetic tracking systems: noise and distortion.

Noise can be reduced with filtering and a general consideration of how the system is used and in what dynamic environment. Distortion is defined as static errors in measurements. The distortion value depends on the position of the sensor.

Figure 2:
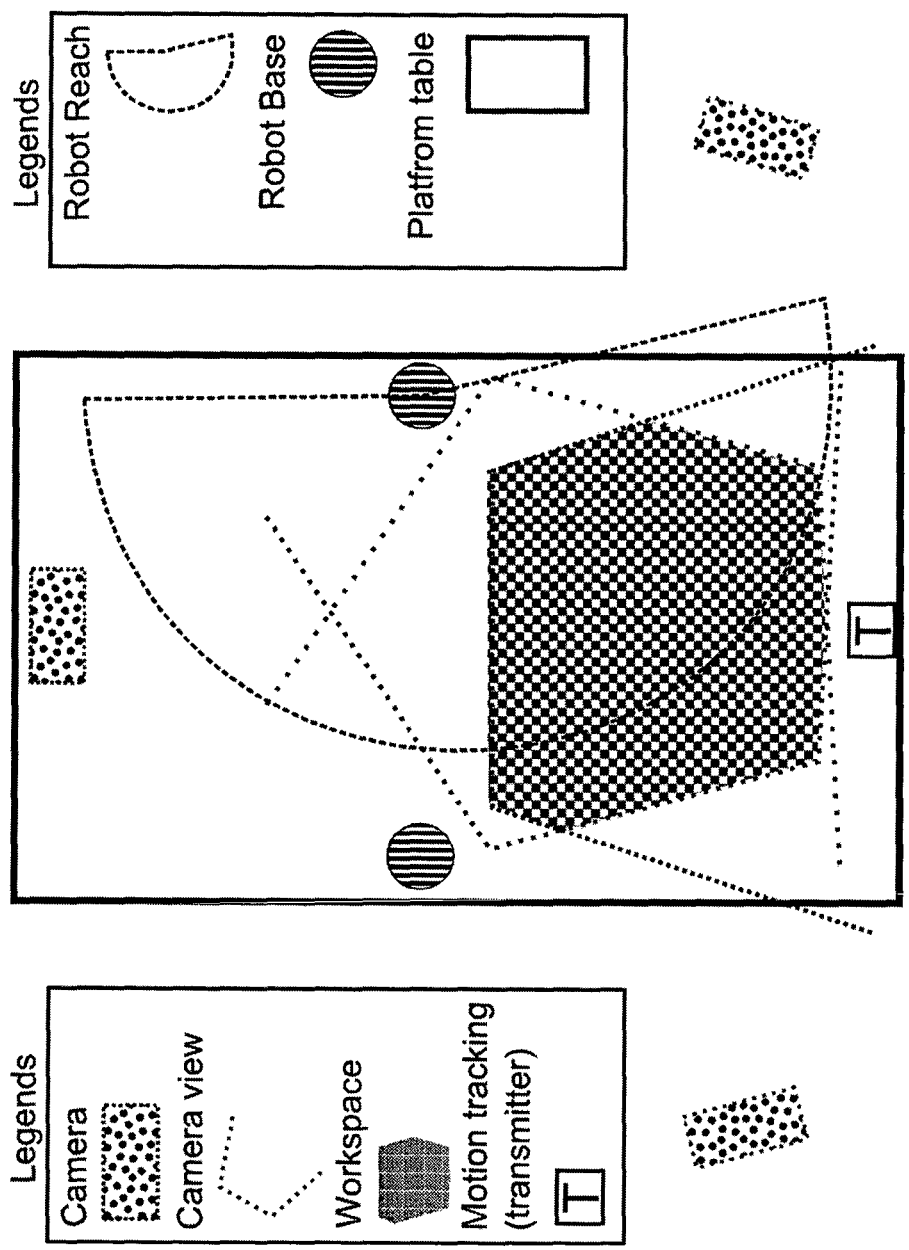
FIG. 2 shows the working zone of the robot as well as cameras and recording means for determining the position and orientation of the object held by the gripper.

The workspace on the platform, where experiments can be performed, are confined to a region limited by the robot's reach and the field of view of the cameras. This workspace is shown in FIG. 2. The cameras are taken into account when defining the workspace and tracking the object's (held by the gripper) motion in space.

Figure 3:
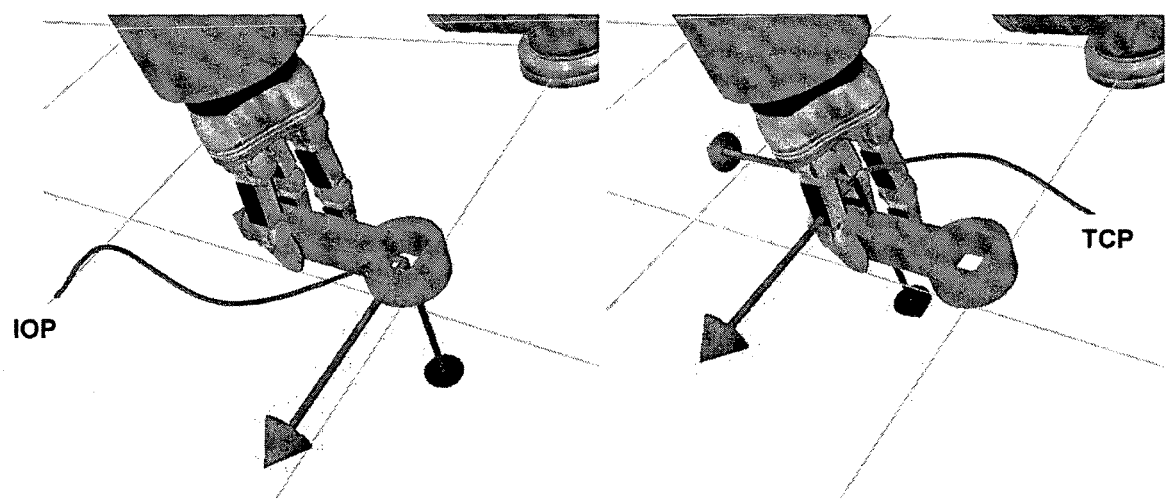
FIG. 3 shows how the dynamic switch results in a shift in the coordinate system (vector shift) in which the object is moved.

In FIG. 3 there is shown how the dynamic switch results in a shift in the coordinate system (vector shift) in which the object is moved. Such a robotic system includes a robot arm with a number of joints and provided with a tool interface movable in a plurality of degrees of freedom, and a tool centre point (TCP) in space, said tool being able to hold an object. There is also a detection unit that detects the position and orientation of the object in space, said detection unit being programmable to detect a specific point in or on the object, said point being defined as an object interest point (OIP). The user operates a control device that can dynamically switch between TCP and OIP based teach modes, and the control device is adapted to let a user instruct movements of the robot arm thereby manually controlling the movement of the object relative to the TCP and OIP. This means that the user decides whether the tool shall be tilted around the TCP or a selected OIP.

Figure 4:
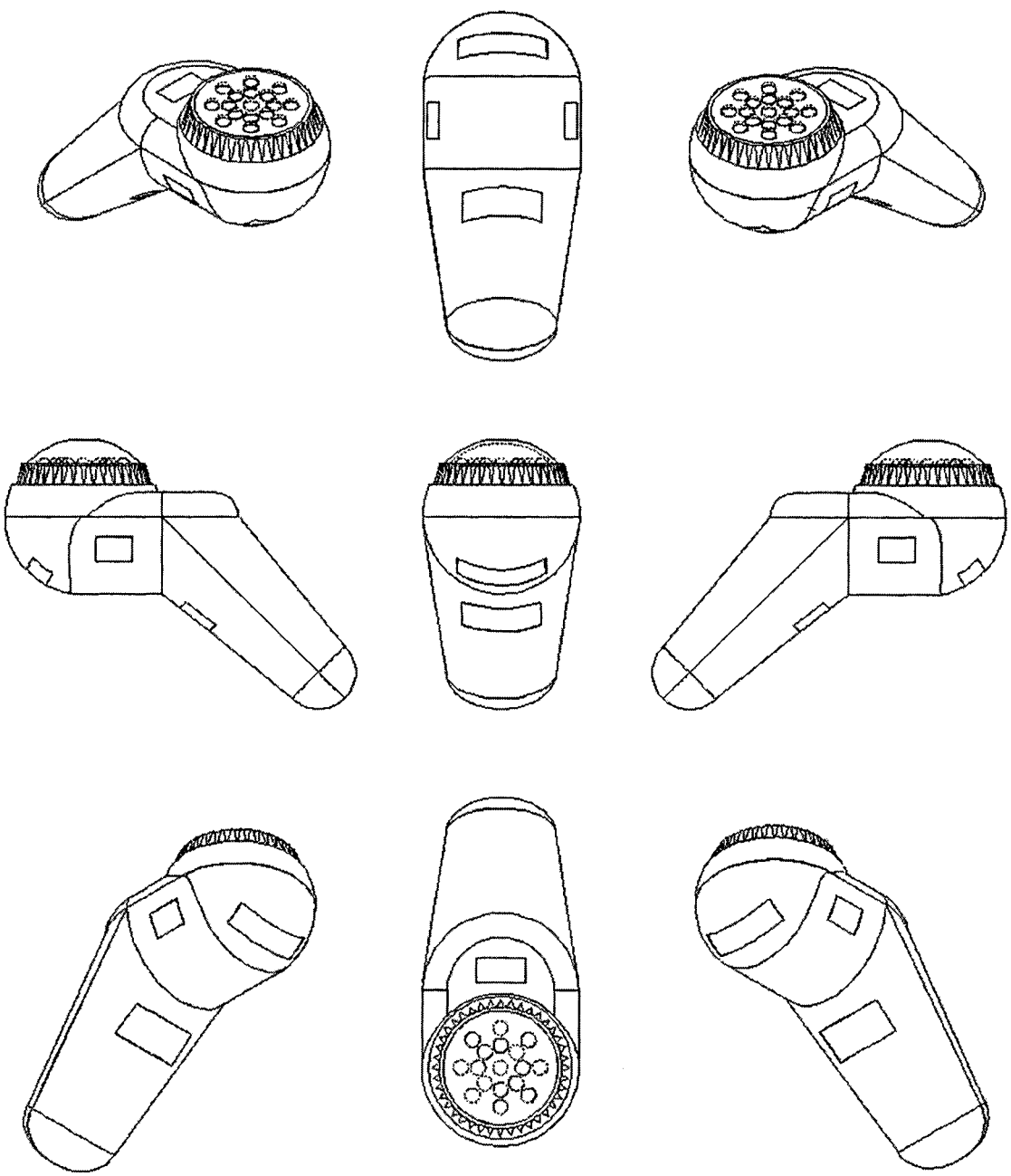
FIG. 4 shows a possible alternative design of the device in which a rotational degree of freedom can be controlled by a rotating sub-unit on the top and where force information can be displayed by means of diodes on top of the rotational sub-unit.

The device can include a rotational part used to control the rotation of the selected control point (TCP or OIP). Moreover the rotational part of the device can be used to control the movement of the individual joint of a robot independent of TCP or OIP. In FIG. 4 there is shown another embodiment of the device in which a rotational degree of freedom can be controlled by a rotating sub-unit on the top and where force information can be displayed by means of diodes on top of the rotational sub-unit.

The invention claimed is:

1. A robotic system comprising:
   a robot arm with one or more joints and provided with a tool interface movable in a plurality of degrees of freedom, and a tool centre point in space, said tool interface being able to hold an object;
   optionally a detection unit that detects a position and orientation of the object in space, said detection unit being programmable to detect a specific point in or on the object, said point being defined as an object interest point;

a user operated control device that can dynamically switch between tool centre point and object interest point based teach modes, said control device adapted to let a user instruct movements of the robot arm thereby manually controlling the movement of the object relative to the tool centre point and/or object interest point;

wherein switching from the tool centre point to object interest point based teach mode results in an operator being able to control robot movements relative to the object interest point.

2. The robotic system according to claim 1, wherein the detection unit uses a set of cameras to detect the position and orientation of the object.

3. The robotic system according to claim 1, wherein a feedback mode is adopted for informing the user of forces experienced by the object.

4. The robotic system according to claim 3, wherein the feedback mode is based on tactile sensing by the user.

5. The robotic system according to claim 4, wherein the feedback is based on vibration of the control device.

6. The robotic system according to claim 1, wherein the control device allows for rotation of the object in the teach mode.

7. The robotic system according to claim 1, wherein a feedback mode is adopted for informing the user of a torque experienced by the object.

8. The robotic system according to claim 3, wherein the feedback mode is based on visual sensing by the user.

9. The robotic system according to claim 3, wherein the feedback mode is based on temperature sensing by the user.

* * * * *

UNITED STATES PATENT AND TRADEMARK OFFICE
CERTIFICATE OF CORRECTION

PATENT NO. : 9,962,835 B2
APPLICATION NO. : 15/105650
DATED : May 8, 2018
INVENTOR(S) : Thiusius Rajeeth Savarimuthu et al.

It is certified that error appears in the above-identified patent and that said Letters Patent is hereby corrected as shown below:

On the Title Page

Item (72) under Inventors, for inventor Thiusius Rajeeth Savarimuthu, please replace "Odense (DK)" with --Odense SV (DK)--,
Item (72) under Inventors, for inventor Dorthe Soelvason, please replace "Odense (DK)" with --Odense SOE (DK)--,
Item (72) under Inventors, for inventor Norbert Krüger, please replace "Odense (DK)" with --Odense SOE (DK)--.

Signed and Sealed this
Twenty-sixth Day of June, 2018

Andrei Iancu
*Director of the United States Patent and Trademark Office*